United States Patent
Dobler et al.

(10) Patent No.: US 6,246,942 B1
(45) Date of Patent: Jun. 12, 2001

(54) SYSTEM FOR EVALUATING VEHICLE DRIVE AND OPERATION PARAMETERS

(75) Inventors: Siegfried Dobler, Langenargen; Karl Mayer, Tettnang; Udo Wolz, Waldenbuch, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/355,574
(22) PCT Filed: Jan. 24, 1998
(86) PCT No.: PCT/EP98/00393
§ 371 Date: Jul. 29, 1999
§ 102(e) Date: Jul. 29, 1999
(87) PCT Pub. No.: WO98/34054
PCT Pub. Date: Aug. 6, 1998

(30) Foreign Application Priority Data

Jan. 31, 1997 (DE) .............................................. 197 03 561

(51) Int. Cl.[7] ....................................................... G06F 7/00
(52) U.S. Cl. ................. 701/51; 701/53; 74/866; 477/110; 477/120
(58) Field of Search .................................. 701/51, 29, 53, 701/58; 74/335, 866; 477/78, 84, 109, 110, 120; 73/118.1

(56) References Cited

U.S. PATENT DOCUMENTS 4,361,060 * 11/1982 Smyth ..................................... 74/866
5,067,374 * 11/1991 Sajau et al. ............................. 74/866
5,730,682   3/1998 Depping et al. ...................... 477/120

* cited by examiner

*Primary Examiner*—William A. Cuchlinski, Jr.
*Assistant Examiner*—Arthur D. Donnelly
(74) *Attorney, Agent, or Firm*—Davis and Bujold

(57) ABSTRACT

The invention concerns a system for evaluating vehicle, drive and operation parameters of a vehicle to select and adjust by means of a microprocessor a speed ratio of a gear according to predetermined calculation rules, characteristic values and characteristic fields wherein an acceleration of the vehicle is mathematically calculated from a number of revolutions of a drive train comprising engine and gear, the number of revolutions corresponding to the driving speed. The problem is to provide for different gear types a uniform system which requires only a few parameters adapted to the vehicle for selecting speed ratio and gear shift. This is attained by the fact that a minimum dwelling time ($\Delta t_f$) is associated to each speed ratio range. To each change of speed ratio ($i_g$) is further associated an adjustment time ($\Delta t_z$) which in the average is required for the gear to complete a speed ratio change ($\Delta i_g$). From the minimum dwelling time ($\Delta t_z$) and the adjustment time ($\Delta t_z$) is calculated, taking into account the vehicle acceleration (a), a change in number of revolutions ($\Delta n_f$, $\Delta n_z$) of the engine during said times. The speed ratio change ($\Delta i_g$) to be carried out is calculated from a set number of revolutions ($n_{set}$) or a gear shift number of revolutions ($n_{shift}$), and is carried out when the real number of revolutions ($n_{real}$) reaches or exceeds the gear shift number of revolutions ($n_{shift}$)

9 Claims, 6 Drawing Sheets

SYSTEM FOR EVALUATING VEHICLE DRIVE AND OPERATION PARAMETERS

BACKGROUND OF THE INVENTION

The invention concerns a system for evaluating vehicle, drive and operation parameters.

The desire for greater economy in motor vehicles with very good driveability demands, better coordination in the characteristic field of a prime mover and the vehicle operating conditions over the most favorable operating ranges. This is achieved with a multi-step or continuously variable transmission having a large speed ratio range. To be able to utilize the advantages, the transmission has to be optimally gear shifted or adjusted, which imposes high demands on the driver. If the continuously variable transmission is regarded as a transmission with several unlimited steps, considerations that apply to multi-step transmissions can, generally, be similarly transferred to a continuously variable transmission. Therefore, for the sake of simplicity, reference will hereinafter is particularly made to multi-step transmissions using the terminology adapted thereto.

In order to unburden the driver and increase comfort in driving, there is increasingly offered vehicles which have a fully automated train consisting of an engine, a starting element, such as a clutch and/or a converter, a gear with different speed ratios and a drive axle with wheels.

Part of the automation consists in selecting, for the respective operating state of the vehicle, a favorable speed ratio and determining the correct gear shift moment. At the same time, it must be taken into consideration that economy and driving comfort must not be impaired by too frequent gear shifts.

Already known are automatically shifting step-changing gears for motor vehicles which automatically shifted within the range of the gears available primarily depending on the number of revolutions and which are proportional to the driving speed and on load states, such as the position of the accelerator pedal or throttle pedal when idling, part load, full load or kick-down. In order to reduce the number of gear shifts, the driver can eliminate from the gear shift sequence, via a selector switch, gears in the upper or lower range, e.g. when mountain driving or in winter operation.

From DE 32 47 658 A is known, by a separate selector lever, to exclude from the automatic gear shift the number of gears not only in the upper range but also simultaneously in the lower range. This is especially favorable when idling or traveling with part load. Of course, the reduced number of automatically shiftable gears results in poor adaptation to the economic operating range of the engine.

It is further known from ATZ 85 (1983) 6, p. 393 ff that a electronic microprocessor system can determine the gear to engage according to a predetermined computing program. In one gear shift characteristic field, if an upshift or downshift characteristic line is reached, the electronic system triggers a corresponding gear shift operation. During the gear shift operation, the torque of the engine becomes reduced in order less to load the friction elements and improve driving comfort. For different driving situations, several programs are provided which have different gear shift characteristic fields. It is possible here to automatically change between the individual gear shift characteristic fields. It is also possible to adapt the gear shift characteristic lines according to desired operation parameters.

For commercial motor vehicles, multi-step mechanical transmissions are often used which are shifted with traction interruption. EP 0 255 519 B1 has disclosed a control device for automatic gear shifting of multi-gear step changing transmissions in which the gear shift points are established depending on the vehicle speed, the momentary requirement (throttle pedal position) and the acceleration determined from the number of revolutions of the gear output shaft. The acceleration is divided in six ranges, namely, a high deceleration, a low deceleration, a constant drive, a low acceleration, a medium acceleration and a high acceleration. Deceleration is computationally considered as negative acceleration.

Besides, the throttle pedal position is divided in three ranges, namely, an empty gas range, a medium position and a full gas range. With each range of the throttle pedal position is associated an acceleration range so that under said premisses eighteen gear shift points result. The gear shift conditions for the gear shift points are contained in tables wherein the values are empirically or computationally determined. According to the number of travel programs used, several tables are needed. The characteristic fields and tables required for the gear shift must be adapted to each type of vehicle and drive train. This involves considerable expenditure, since more than 3000 data must be considered. Besides, changes between the many unevenly stepped gear shift conditions are critical, since interactions can easily be generated which act unfavorably on the driveability of the vehicle.

SUMMARY OF THE INVENTION

The invention is based on the problem of providing a system for the selection of the gear speed ratios which can be uniformly applied to different, automatically adjustable gears and require less tuning parameters.

The invention is adequate for all vehicles having a fully or partly automated drive train consisting of an engine with or without a starting element, such as a clutch and/or a converter, a gear with different speed ratios and a drive axle with vehicle wheels. This transmission can be both a continuously variable transmission or a stepped transmission which is shifted with traction interruption or under load.

For each speed ratio or for each speed ratio range, a minimum dwell time is preset during which the speed ratio is not adjusted unless the vehicle acceleration is so high that during this time an upper or lower gear shift limit number of revolutions is reached.

Also preset is an adaptively fittable adjustment time, gear shift time, which on average is needed to change the gear from one speed ratio to another speed ratio. Taking into account the vehicle acceleration from the minimum dwell time and the adjustment time, an appertaining change in number of revolutions of the engine is calculated from which a set change in number of revolutions is determined. Finally, a gear shift number of revolutions is calculated as function of the set change in number of revolutions, of a minimum or maximum and of an economical optimum operation number of revolutions of an engine. In the engine characteristic field, the shift number of revolutions lies between an economical operation range and a lower or upper limit of number of revolutions of the engine. The ratio of the optimum operation number of revolutions to the gear shift number of revolutions is equal to the ratio of the set speed ratio to the real speed ratio. The change of speed ratio or the new speed ratio is engaged in order to return the operation point of the engine with an equal performance as possible to the economy range as soon as the real number of revolutions reaches or exceeds the gear shift number of revolutions.

Since the essential control parameters are interlinked by computer rules, consistent, clear evaluations result, and the number of parameters to be coordinated is substantially diminished by a factor 10. It is convenient to multiply the minimum dwell time, corresponding to different driving states, by preset factors. The minimum dwell time, can e.g. be multiplied in a kick-down downshift by the factor 1.4 and in a coasting downshift by the factor 0.2. Generally these factors do not apply, but must be synchronized with the existing vehicle type empirically or adaptively according to an optimization criterion.

If the speed ratio change is certain, a gear shift is effected as soon as the real number of revolutions reaches or exceeds the determined gear shift number of revolutions, specifically downwardly relative to a downshift and upwardly when an upshift must be effected. It has to be taken into account here that the minimum and maximum operation number of revolutions of the engine still has not been reached and the engine has, at the new operation point, a surplus of power sufficient for the acceleration of the vehicle. If the acceleration is such that a maximum or minimum operation number of revolutions has been reached, an upshift or downshift is immediately carried out. For reasons of security, it is convenient to keep a safe distance from the maximum or minimum operation number of revolutions.

More specific details and advantages are described herebelow with the aid of the drawing.

BRIEF DESCRIPTION OF THE DRAWINGS

Embodiments of the invention are shown in the drawings, by way of example. In the drawing.

DESCRIPTION OF THE PREFERRED EMBODIMENT(S)

Figure 1:
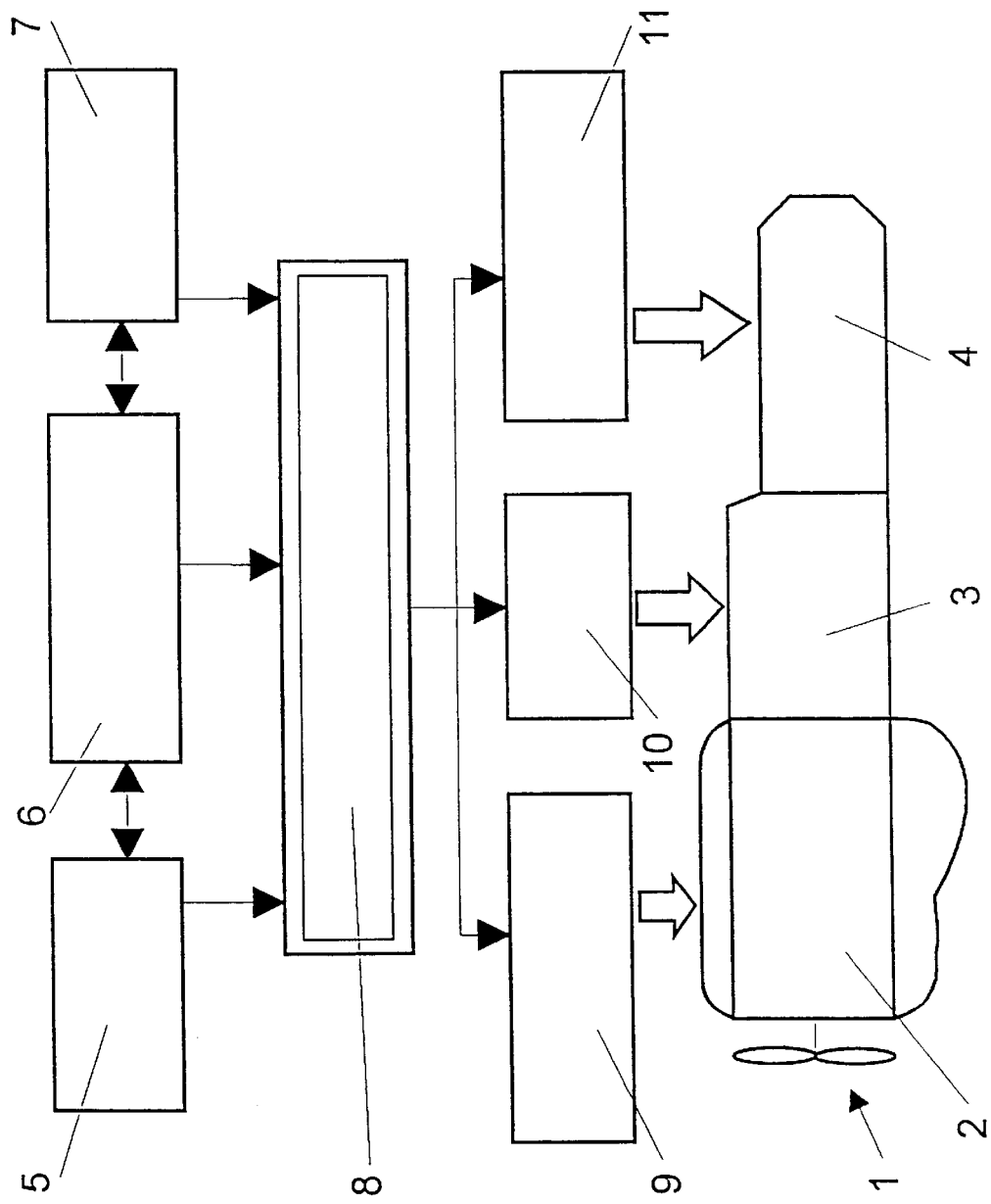
FIG. 1 is a diagram of a drive train regulation.

A drive train 1 has an engine 2, a starting element, e.g. a clutch or a converter, 3 and a gear box 4. The gear box 4 can be a continuously variable or a stepped transmission which is gear shifted with traction interruption and/or under load. A microprocessor 8 controls the input units 2, 3 and 4 of the drive train 1 depending on operation parameters 5, input parameters 6 and vehicle parameters 7 and according to preset computer rules produces characteristic values and fields for servo components 9 of the engine 2, for servo components 10 of the clutch 3 and servo components 11 of the gear box 4. To the operation parameters 5 belong, e.g. the position of an accelerator pedal, as a rule a throttle pedal, the change thereof during a time interval, the same as the acceleration of the accelerator pedal actuation and braking and steering signals. To the input parameters 6 belong the position of a fuel allotting element or a load signal, a number of engine revolutions, an ignition firing angle adjustment, a temperature, e.g. coolant temperature, aggregate temperature, etc. To the vehicle and gear parameters 7 belong a position of the selector lever or of an adjustment or gear shift device of the gear box 4, driving speed or, coherent therewith, the number of revolutions in the drive train, longitudinal and transverse accelerations, loading states, tractional resistances and temperatures.

Figure 2:
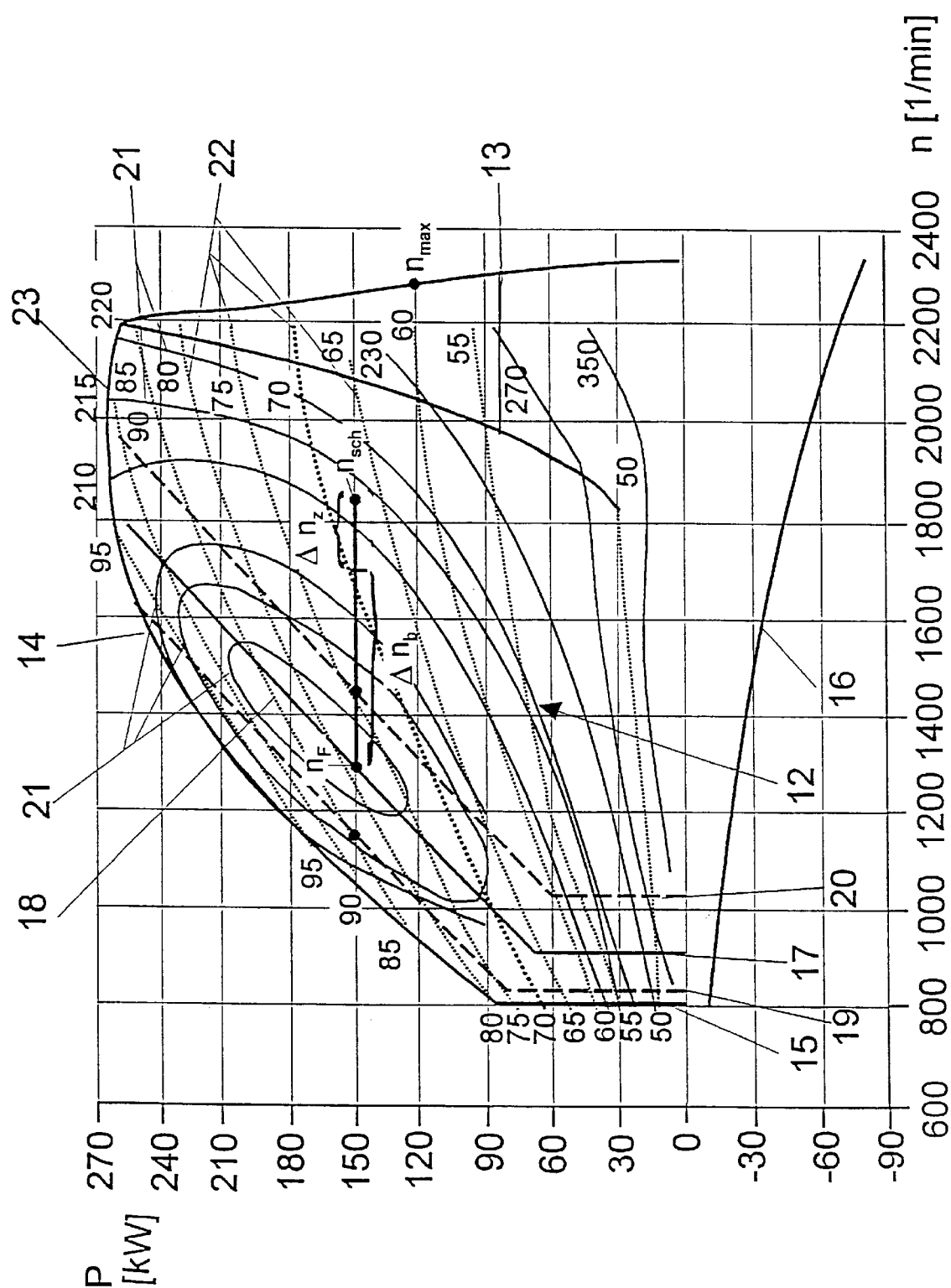
FIG. 2 is an engine characteristic field.

In FIG. 2 is shown a characteristic field of an engine 2, specifically of a Diesel engine. The engine power P is plotted in kW over the number of engine revolutions n. Engines with other ignition systems and characteristic fields can also be used.

An operation range 12 of the engine 2 is limited to the right by a line 13 of the maximum operation number of revolutions, on top by a line 14 of the maximum performance, to the left by a line 15 of the minimum operation number of revolutions which corresponds, e.g. to the idle number of revolutions or to a lower concentric number of revolutions of the engine 2 and at bottom by a coasting performance line 16. Also plotted in the table are lines 21 which connect points having the same specific fuel consumption. The numbers on the lines 21 indicate the fuel consumption in g/kWh.

Dotted lines 22 characterize points of equal accelerator pedal position or of a position of a fuel measuring element connected with the accelerator pedal. The numbers on the group of curves 22 indicate the percentage based on the maximum position of the accelerator pedal. The lines 13 to 22 are calculated from measured values of the engine manufacturer and are stored in a memory of the microprocessor 8. Also stored in the memory are vehicle data such as weight (bulk m), the gear speed ratios $i_g$, gear degrees of effectiveness, minimum dwelling times $\Delta t_f$ and gear shift times $\Delta t_z$.

Figure 3:
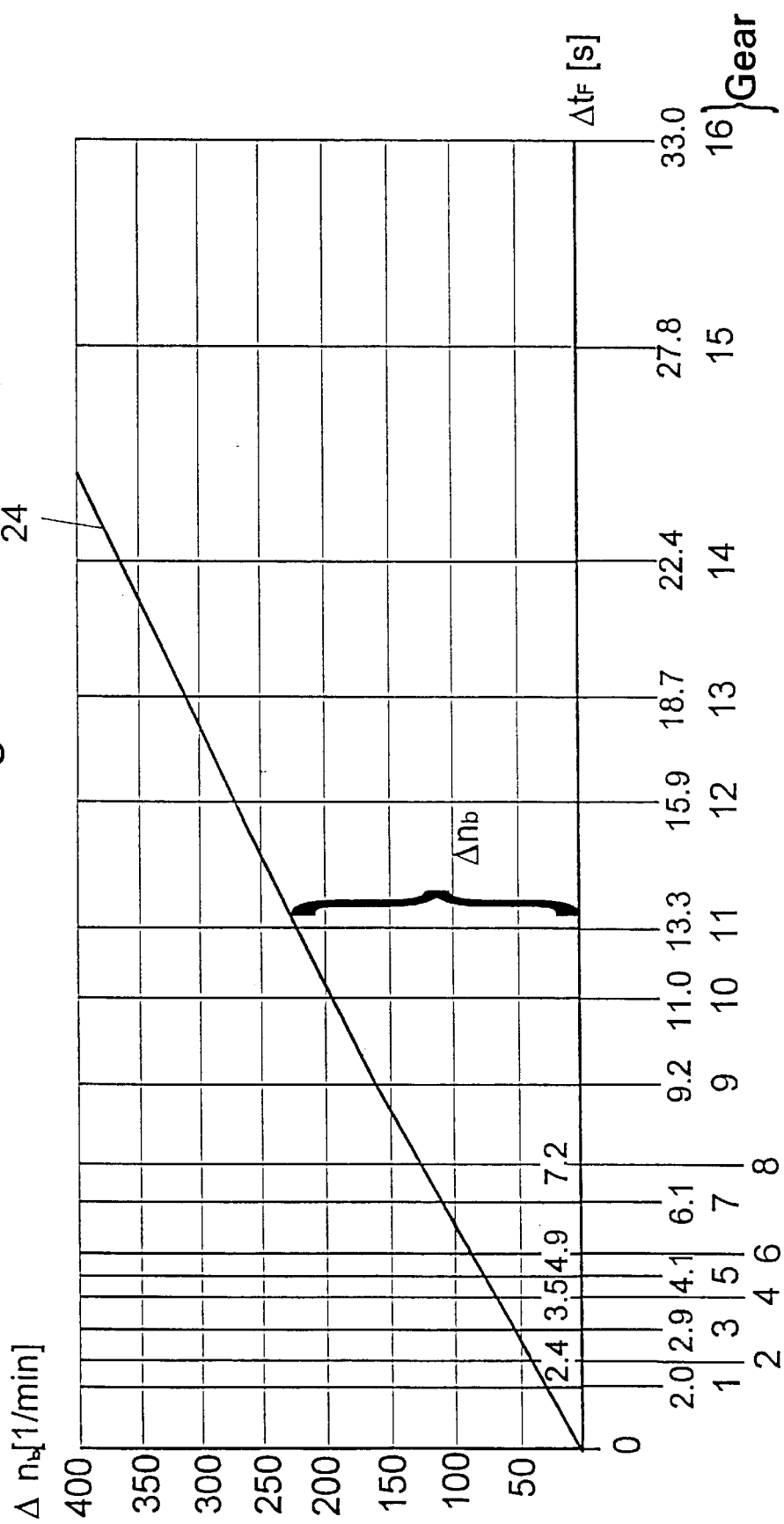
FIG. 3 is a table over minimum dwell times and changes in the number of revolutions in different speed ratio steps.

In the characteristic field is also plotted an economy drive range 18 with a drive line 17, a lower limit 19 and an upper limit 20. The drive line 17 connects operation points with minimum specific fuel consumption. In general it has been sought to operate the engine in different drive conditions in the proximity of the drive line 17 within the drive range 18. In many situations, however, the consumption is of secondary importance compared to the driveability, e.g. in kick-down or braking operation. A maximum driving or braking performance is here in the foreground. Specifically when primary brakes are used, the number of engine revolutions n is of decisive importance for the braking performance. For the rest, the following driving strategy is used:

In the first place minimum dwell times $\Delta t_f$ are established for each speed ratio $i_g$. FIG. 3 shows by way of example minimum dwell times $\Delta t_f$ in seconds for a 16-gear transmission. The minimum dwell times $\Delta t_z$ sought increase from the lowest gear 1 with the highest speed ratio $i_g$ to the highest gear 16 with the lowest speed ratio $i_g$. In the diagram of FIG. 3 is plotted an arbitrary acceleration line 24 of the vehicle. If the vehicle is operated with said acceleration, there is reached during the associated minimum dwelling time $\Delta t_f$ a certain difference in number of revolutions $\Delta n_b$ of the engine 2.

If the gear 4 is shifted from one speed ratio $i_g$ to another, a gear shift time $\Delta t_z$ is needed for that. The gear shift time $\Delta t_z$ to a certain extent depends on the speed ratio change $\Delta i$ which is to be shifted.

Figure 4:
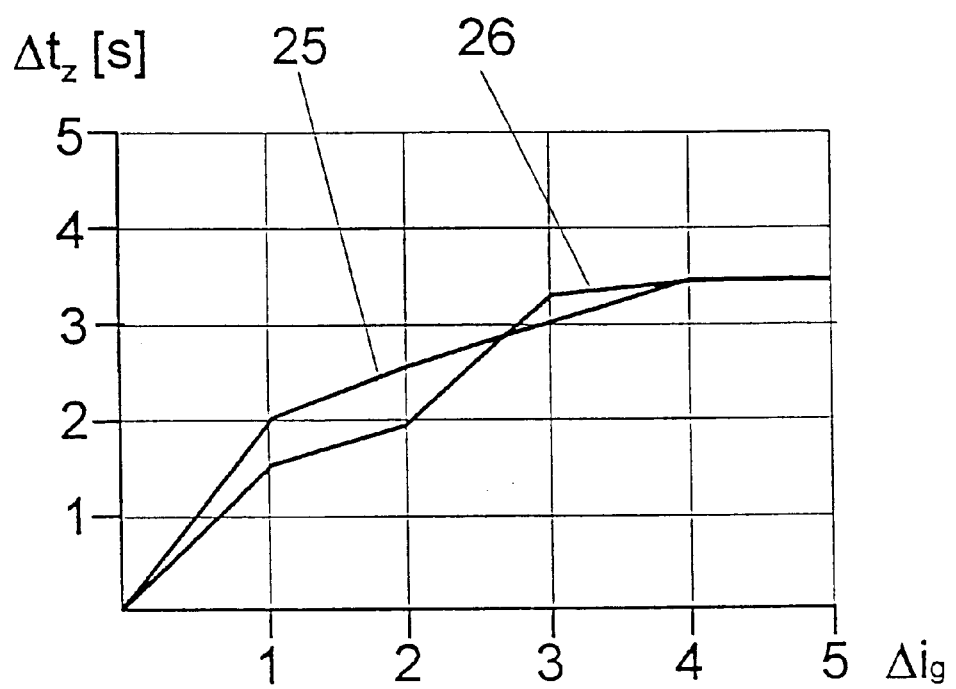
FIG. 4 is a table of gear shift times.

FIG. 4 contains gear shift times $\Delta t_z$ for speed ratio changes of up to four gears in a 16-gear transmission 4. For greater speed ratio changes $\Delta i$, which appear relatively rarely, the gear shift time $\Delta t_z$ increases no more. In addition the gear shift times $\Delta t_z$ for the upshifts, identified by the line 26, differ from the gear shift times $\Delta t_z$ for the downshift identified by the line 25.

To detect the acceleration of the vehicle, the change of speed or a change in number of revolutions in the drive train connected therewith is measured and the acceleration is calculated from two consecutive measurements. To be sure that a positive or a negative acceleration a is involved, small acceleration values by zero are defined as zero, that is, the vehicle moves in this range at approximately constant speed. If in that case the operation point of the engine 2 is in the economy range 18 of the characteristic field, no gear shift is carried out. But if the microprocessor 8 detects an acceleration a clearly divergent from zero, therefrom it calculates with the respective minimum dwelling time $\Delta t_f$ a difference in number of revolutions $$\Delta n_b = i_g/r_{dyn} * \Delta t_f * a * 60/2\pi,$$

wherein $i_g$ is the total speed ratio in the respective gear and $r_{dyn}$ the dynamic radius of a driven vehicle wheel. Since the vehicle also changes its speed during the gear shift and thus the engine number of revolutions must be accordingly adapted to the new gear to be engaged, the microprocessor 8 calculates an additional difference in number of revolutions $\Delta n_z$ from the gear shift time $\Delta t_z$ and the acceleration a effective during this time. In gears 4 which are engaged with traction interruption, the tractional resistance acts upon the vehicle during this time. The difference in number of revolutions $\Delta n_z$ is $$\Delta n_z = F_w/m * i_g/r_{dyn} * \Delta t_z * 60/(2*\pi).$$

In accordance with the operation, input and drive parameters 5, 6, 7, the microprocessor 8 periodically determines the real operation state and the position of the operation point in the engine characteristic field. If the operation point during normal drive is within the economy drive range 18, no gear shift is needed. If the present operation point is outside of said drive range 18, the microprocessor determines a gear shift number of revolutions $n_{shift}$. At this number of revolutions the gear 4 is upshifted or downshifted according as whether on a line of constant performance the gear shift point is to the right or left of the drive line 17.

Figure 5:
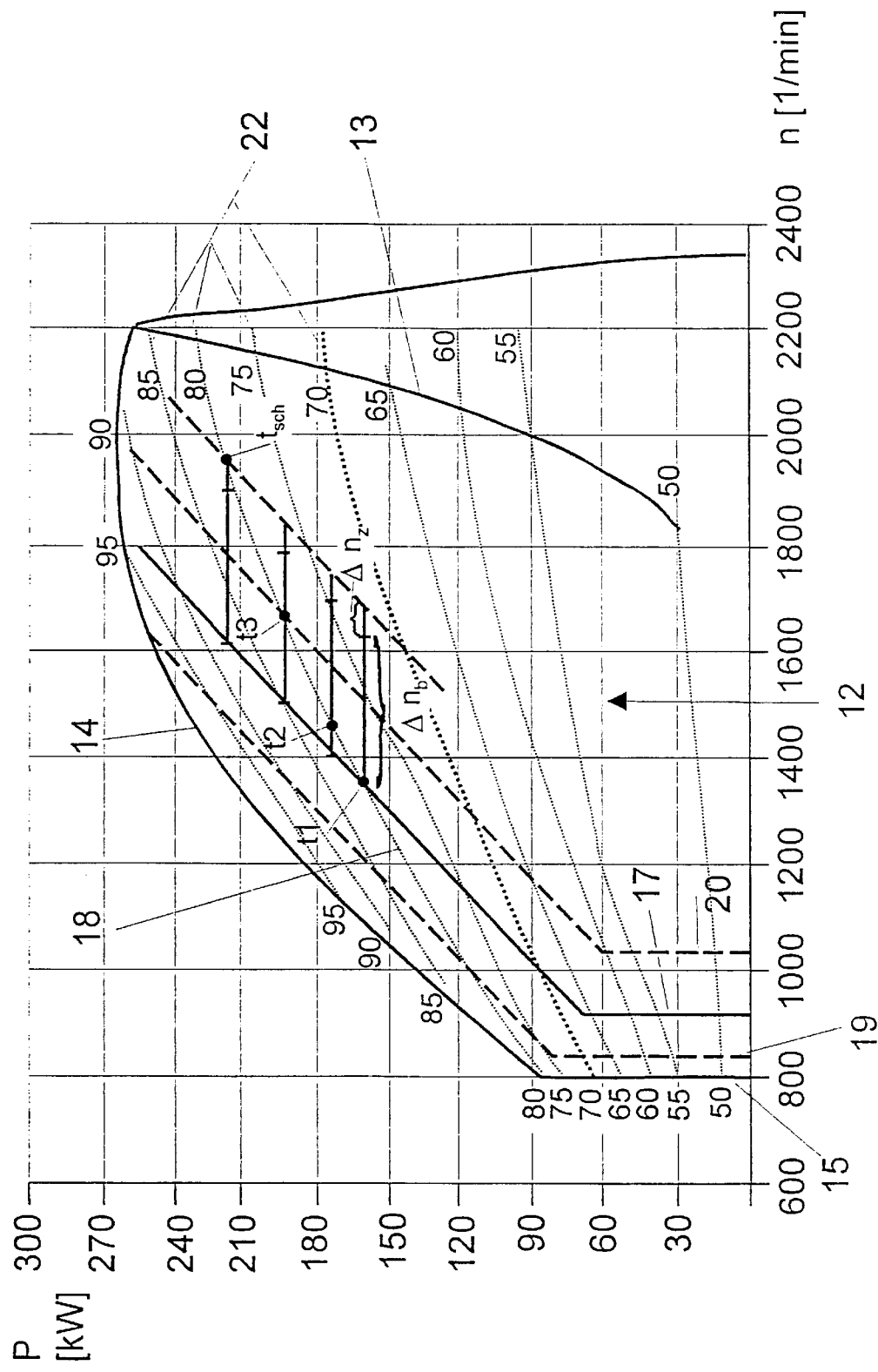
FIG. 5 is an engine characteristic field with traction upshift and FIG. 6 is an engine characteristic field with traction downshift.

FIG. 5 shows an upshift when the vehicle accelerates in level road. At the $t_1$ moment the operation point of the vehicle, with a throttle pedal position of 80%, is above the driving line 17. Following the acceleration a the operation point at the $t_2$ moment is in a higher engine number of revolutions which has further risen at the $t_3$ moment, the line of the throttle pedal position of 80% cutting the upper limit 20 of the economy drive range 18.

Departing from the number of revolution $n_f$ on the drive line 17, the gear shift number of revolutions $n_{shift}$ is determined by adding to the number of revolutions $n_f$ on the drive line 17 the difference of the number of revolutions differences $\Delta n_b$ and $\Delta n_z$ $$n_{shift} = n_f + (\Delta n_b - \Delta n_z)$$

Since during an interruption of traction the driving speed and thus the engine number of revolutions n changes by the difference in number of revolutions $\Delta n_z$, only the difference in number of revolutions $\Delta n_b$ has to be balanced when gear shifting.

Therefrom results a set speed ratio of $$i_{set} = i_{real} * n_f/(n_{shift} + \Delta n_z)$$

For the calculated set speed ratio $i_{set}$ there is selected a suitable speed ratio $i_g$ which is engaged as soon as the real number of revolutions $n_{real}$ is higher than or equal to the priorly determined gear shift number of revolutions $n_{shift}$.

The engine 2 is then set corresponding to its characteristic field at the new load operation point, the new engine load position being approximately equal to the former multiplied by the ratio of the former speed ratio $i_{real}$ to the set speed ratio $i_{set}$, provided an electronic engine load control is available.

Figure 6:
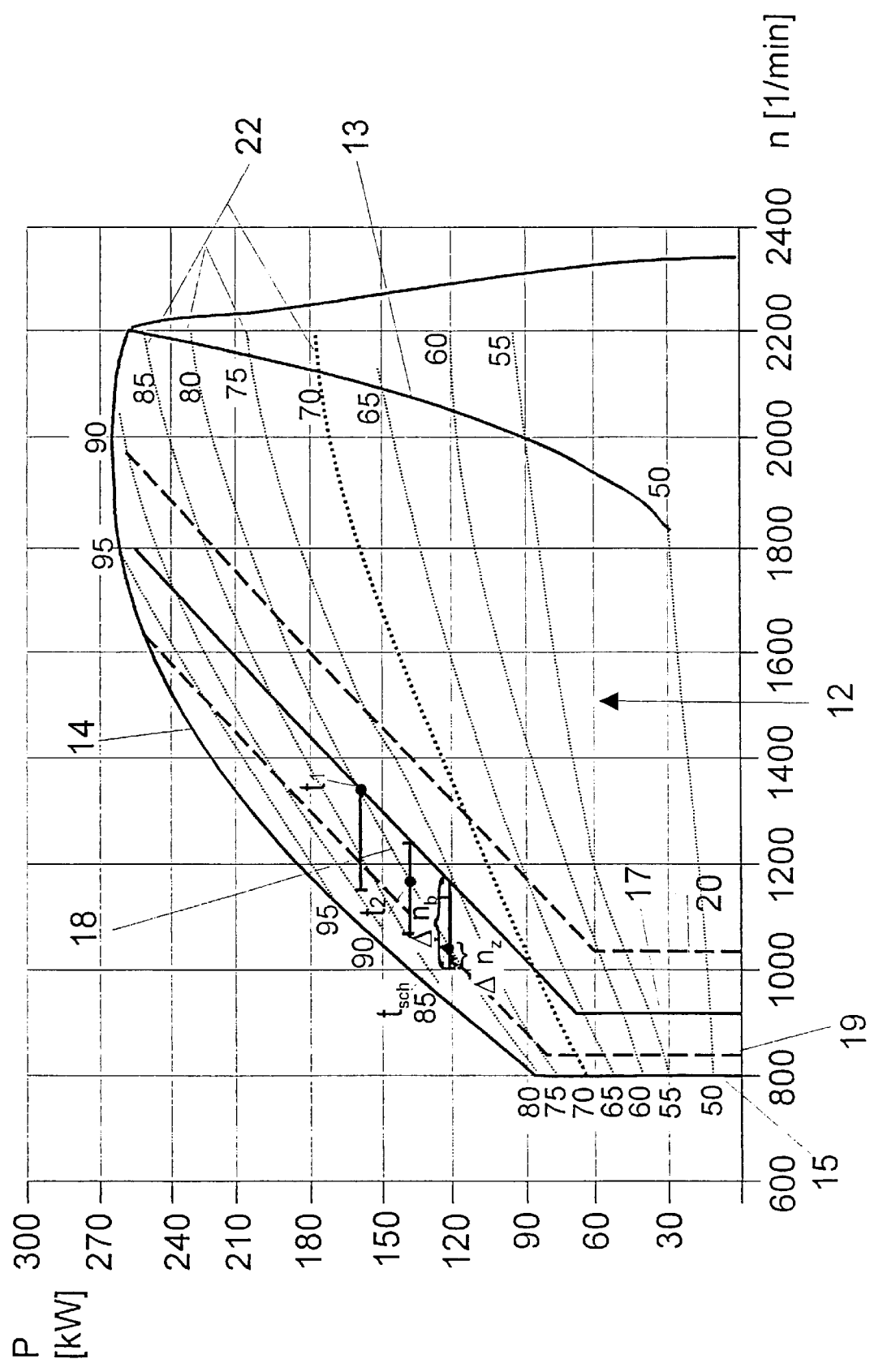

FIG. 6 shows a downshift. It takes place when the vehicle speed in the tractional operation of the engine 2 diminishes, e.g. when the vehicle moves uphill. In this case the acceleration becomes negative so that the difference in number of revolution $\Delta n_b$ of the engine 2 resulting therefrom likewise becomes negative and thus both $\Delta n_b$ and $\Delta n_z$ are negative. Therefore, the difference between the two values is also negative, subtracted from $n_f$ and results in $n_{shift}$. It follows from this that the speed ratio change $\Delta n_b$ to be engaged must correspond. It has now to be downshifted by the corresponding gear steps. A gear shift, of course, is performed only when the real number of revolutions $n_{real}$ reaches or falls below the gear shift number of revolutions $n_{shift}$ or reaches a limit condition.

In coasting operation, when the drive torque of the engine 2 is negative, that is, braked, an upshift is performed while speed rises as in the normal operation. But if a braking signal is active, the shift is not performed until the real number of revolutions $n_{real}$ is higher than or equal to the maximum engine number of revolutions $n_{max}$, and in fact the upshift is only by one gear step. For reasons of security, a safety distance is conveniently kept from the maximum engine number of revolutions $n_{max}$.

If two braking signals are active while the speed is rising, e.g. the signals of a service brake and of an engine brake and/or of a retarder, no upshift is carried out. This situation corresponds to an emergency situation, that is, despite several active brakes, the vehicle accelerates. Therefore, an upshift is not effected even if the engine 2 becomes damaged.

In coasting operation, in case of deceleration, a downshift is generally effected like in normal operation. If one or more braking signals are active, a downshift is carried out as in a kick-down drive state in order to obtain the best possible braking performance by using a high engine number of revolutions. When the vehicle falls below a minimum speed, the starting element is activated.

When the driver actuates a kick-down switch on the throttle pedal, or when the load signal exceeds a limit value, the kick-down drive state begins. The driver then wishes immediately the greatest possible driving performance ab, that is, great acceleration, highest driving speed, shifting over several gears, not too frequent interruptions of gear shift. The engine 2 is here operated to the full load line 14 in the proximity of the rated speed $n_{Ne}$, certainly up to the governed range $n_{max}$, when no connecting speed ratio with a sufficient tractional surplus is found. The gear shift strategy in the kick-down drive range is similar to that of the normal drive, but instead of a gear shift number of revolutions $n_{shift}$, a set difference in number of revolutions $n_{set}$ is determined which is to be reached by downshifting during a pull downshift and presence of a new kick-down signal in order to come closer to the rated number of revolutions $n_{Ne}$ of the engine.

$$\Delta n_{set} = n_{real} - n_{Ne} \Delta n_z.$$

Accordingly, a reference base here serves as the rated number of revolutions $n_{Ne}$ which has been corrected by the difference in number of revolutions $\Delta n_z$.

From the equation $$n_{real}(1 - i_{set}/i_g) \geq \Delta n_{set}$$

the new speed ratio $i_{set}$ can be determined by an iterative computation process.

If the vehicle is already in the kick-down drive state and is accelerated, the acceleration at the rated number of revolutions $a_{Ne}$ is selected as acceleration a and with said acceleration is calculated the difference in number of revolutions $\Delta n_b$ (see below). Besides, as tractional resistance is determined the tractional resistance existing when reaching the rated number of revolutions so that $\Delta n_z$ results as difference in number of revolutions $$\Delta n_z = F_{WNe} * 1/m * i_g/r_{dyn} * \Delta t_z * 60/(2*\pi).$$

The gear shift number of revolutions $n_{shift}$ is calculated departing from the rated number of revolutions:

$$n_{shift} = n_{Ne} - n_z \leq n_{max},$$

Upshift is effected when an excess of force results for the new gear in comparison with the situation in rated number of revolutions $n_{Ne}$. This is equal to the difference between the input force $F_{An}$ minus the tractional resistance $F_W$.

In the kick-down driving operation, downshift is effected under traction when the vehicle decelerates, e.g. moves uphill. As set difference in number of revolutions here results $$\Delta n_{set} = \Delta n_b + \Delta n_z.$$

The new speed ratio $i_{set}$ is again determined from the equation $$n_{real} * (1 - i_{set}/i_g) \geq \Delta n_{set}.$$

The gear shift range is reached when $n_{real}$ is $\leq n_{shift}$. The rear shift number of revolutions $n_{shift}$ is determined departing form the rated number of revolution $n_{Ne}$ taking into account the differences in number of revolutions $\Delta n_b$ and $\Delta n_z$, $$n_{shift} = n_{Ne} - \Delta n_z + \Delta n_b.$$

| Reference numerals | | | |
|---|---|---|---|
| 1 | drive train | 26 | gear shift line for upshift |
| 2 | engine | a | vehicle acceleration |
| e | clutch/converter | $F_{an}$ | input force |
| 4 | gear | $F_W$ | tractional resistance |
| 5 | operation parameter | $F_{WNe}$ | tractional resistance at rated number of revolutions |
| 6 | drive parameter | | |
| 7 | vehicle parameter | $i_g$ | total speed ratio in the respective gear |
| 8 | microprocessor | | |
| 9 | servo component for the engine | $i_{real}$ | engaged speed ratio (total) |
| 10 | servo component of the clutch | $i_{se}$ | speed ratio to be engaged (total) |
| 11 | servo component for the gear | | |
| 12 | operation range of the engine | m | vehicle bulk |
| 13 | line of maximum engine number of revolutions | n | engine number of revolutions |
| 14 | line of maximum performance | $n_{real}$ | momentary number of revolutions |
| 15 | line of maximum engine number of revolutions | $n_{max}$ | maximum number of revolutions |
| 16 | coasting performance line | $n_{min}$ | minimum number of revolutions |
| 17 | drive line | | |
| 18 | economy drive range | $n_{ne}$ | rated number of revolutions |
| 19 | lower limit of the economy drive range | $n_{shift}$ | shift number of revolutions at beginning of a gear shift |
| 20 | upper limit of the economy drive range | $\Delta n_b$ | change in number of revolutions during the |
| 21 | line of equal specific fuel consumption | $\Delta n_z$ | dwelling time during the gear shift time |
| 22 | line of equal accelerator pedal position | $\Delta n_{set}$ | set difference in number of revolutions |
| 23 | number of revolutions in rated performance | $t_1, t_2, t_3$ | moment |
| | | $t_{shift}$ | gear shift moment |
| 24 | acceleration line | $\Delta t_f$ | dwelling time |
| 25 | gear shift line for downshift | $\Delta t_z$ | gear shift time |

What is claimed is:

1. A system for evaluating vehicle, drive and operation parameters (5, 6, 7) of a vehicle in order to select and adjust by means of a microprocessor (8) a speed ratio of a gear (4) according to predetermined calculation rules, characteristic values or characteristic fields, wherein from the change of a number of revolutions of a drive train (1) having an engine (2) and a gear (4) corresponding to the vehicle speed, an acceleration (a) of the vehicle is computationally determined, characterized by the following features:

with each speed ratio ($i_g$) is associated a minimum dwelling time ($\Delta t_f$) during which the speed ratio ($i_g$) is not adjusted, with each speed ratio change ($\Delta i_g$) is associated an adjustment time ($\Delta t_z$) which in the average is required to adjust the gear by a speed ratio change ($\Delta i_g$), from the dwelling time ($\Delta t_f$) and the adjustment time ($\Delta t_z$) changes in the number of revolutions (($\Delta n_b$, $\Delta n_z$) of said engine (2) are calculated during said times taking into account the vehicle acceleration (a), with the changes in number of revolutions ($\Delta n_b$, $\Delta n_z$), departing from a number of revolutions ($\Delta n_f$) on a drive line (17) with the same performance (P) and optimum specific fuel consumption, a shift number of revolutions ($n_{shift}$) is determined which lies between an economy drive range (18) and the maximum or minimum authorized number of revolutions and a set speed ratio ($i_{set}$) is calculated from a real speed ratio ($i_{real}$) multiplied by the ratio of the number of revolutions ($n_f$) on the drive line (17) to the shift gear number of revolutions ($n_{shift}$) and a possible speed ratio ($\Delta i_g$) is selected.

2. The system according to claim 1, wherein the dwelling time ($\Delta t_f$) corresponding to different driving situations is multiplied by predetermined or adaptive factors.

3. The system according to claim 2 wherein driving conditions are kick-down upshift, kick-down downshift, load upshift, load downshift, coasting upshift, coasting downshift and gear shift with brake actuation.

4. The system according claim 1, wherein the speed ratio change ($\Delta i_g$) selected is engaged when the real number of revolutions ($n_{real}$) exceeds the determined shift gear number of revolutions ($n_{shift}$) or reaches the minimum or maximum operation number of revolutions.

5. The system according to claim 1, wherein the selection of the set speed ratio ($i_{set}$) is started when the engine operation point is no longer within the economy drive range (18).

6. The system according to claim 1, wherein in coasting operation no upshift is effected when several braking signals are active.

7. The system according to claim 1, wherein in coasting operation a downshift is effected when several braking signals are active and the number of revolutions of the engine (2) is less then the rated number of evolutions ($n_{Ne}$) of the engine, provided the engine allows a superincreased coasting number of revolutions.

8. The system according to claim 1, wherein a set difference in number of revolutions ($\Delta n_{set}$) is formed from the real number of revolutions ($n_{real}$) and the rated number of revolutions ($n_{Ne}$) taking into account the change in number of revolutions ($\Delta n_z$) during the gear shift time ($\Delta t_z$) and the new speed ratio ($i_{set}$) is calculated from the equation $$n_{real}*(1-i_{set}/i_g) \geq \Delta n_{set}$$

as soon as a kick-down switch is actuated at the beginning of a kick-down drive state or a corresponding load signal crops up and the real number of revolutions ($n_{real}$) is less than the rated number of revolutions ($n_{Ne}$).

9. The system according to claim 1, wherein in an acceleration (a) greater than zero and a real number of revolutions higher than or equal to the rated number of revolutions ($n_{Ne}$), the acceleration at the rated number of revolutions ($n_{Ne}$) is stored as acceleration value and the gear shift number of revolutions ($n_{shift}$) is calculated based on the rated number of revolutions ($n_{Ne}$).

* * * * *